United States Patent [19]

Clarke et al.

[11] 3,997,089

[45] Dec. 14, 1976

[54] SEALING HOPPER CLOSURE ASSEMBLY

[75] Inventors: Edwin E. Clarke, Allentown; Albert J. Florig, Norristown, both of Pa.

[73] Assignee: Florig Equipment Company, Inc., Conshohocken, Pa.

[22] Filed: Mar. 24, 1975

[21] Appl. No.: 561,057

[52] U.S. Cl. ............................ 222/545; 105/280; 105/283; 105/308 E; 298/30; 302/62
[51] Int. Cl.² .................... B60P 1/56; B61D 7/18; B61D 7/22; B61D 7/26
[58] Field of Search ....... 105/280, 281, 283, 308 E; 222/545; 298/30; 302/62

[56] References Cited

UNITED STATES PATENTS

| | | | |
|---|---|---|---|
| 1,517,245 | 12/1924 | Martin | 105/308 E X |
| 2,821,433 | 1/1958 | Hamlet | 298/30 |
| 3,296,980 | 1/1967 | Fritz | 105/280 X |
| 3,396,675 | 8/1968 | Stevens | 105/280 |

Primary Examiner—Robert J. Spar
Assistant Examiner—Howard Beltran
Attorney, Agent, or Firm—Mason, Fenwick & Lawrence

[57] ABSTRACT

A discharge gate assembly for sealing and controlling the flow of particulate material from a discharge opening in a hopper of the type used on semi-trailers, railroad cars or storage bins is disclosed wherein the discharge gate assembly comprises a frame which is secured over the discharge opening and has a discharge passageway through which particulate material can fall when the hopper is being emptied, a valve means in the discharge passageway to regulate the flow of material through the discharge passageway, a seal between the frame and hopper to prevent contamination from entering the discharge opening and hopper, and a cover means for sealing the lower end of the discharge passageway to prevent entry of any contaminants.

8 Claims, 4 Drawing Figures

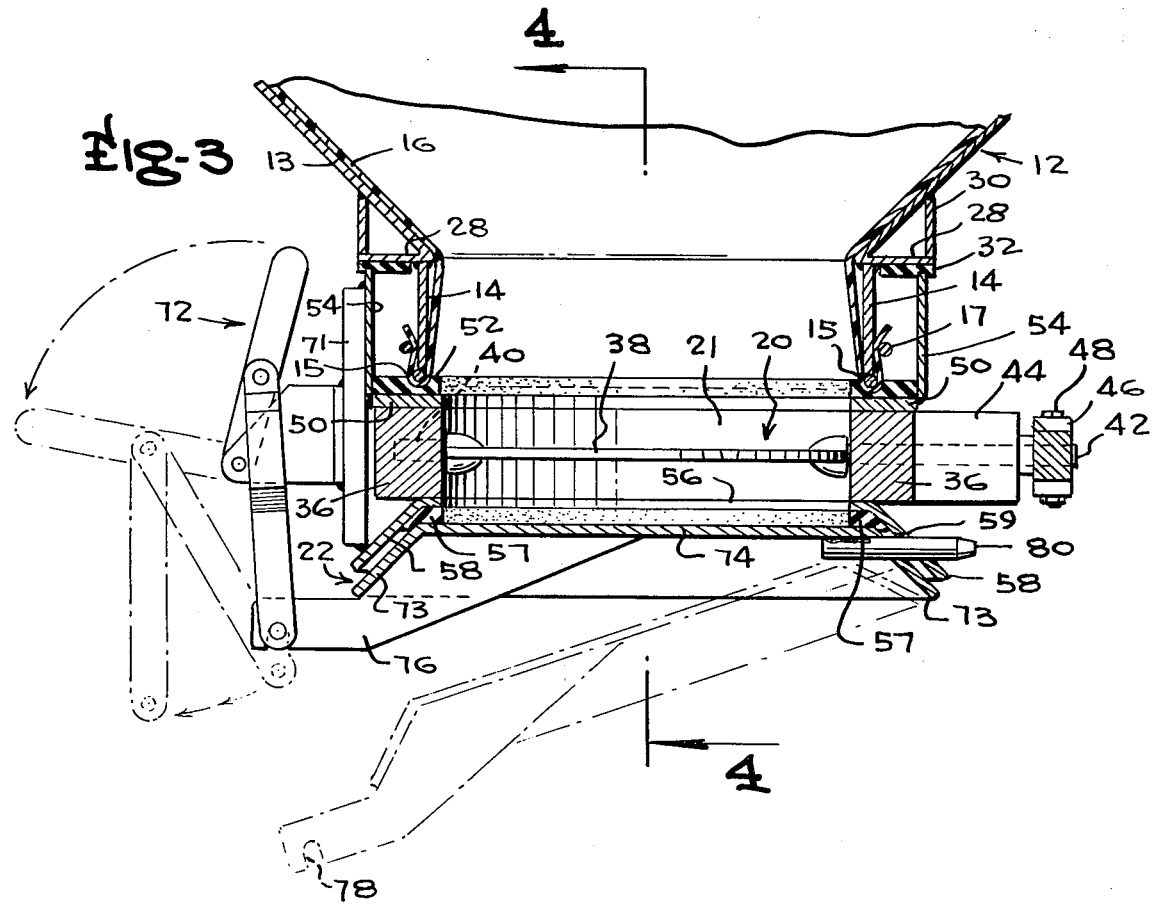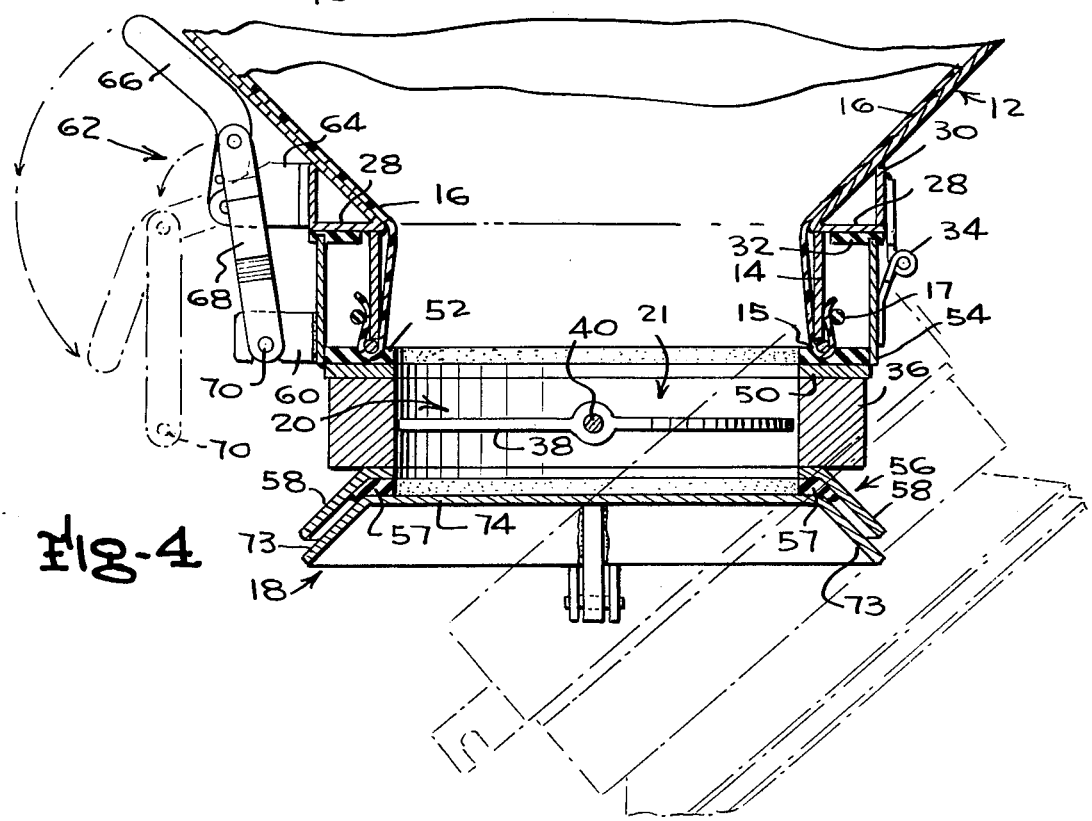

SEALING HOPPER CLOSURE ASSEMBLY

BACKGROUND OF THE INVENTION

This invention is generally related to closure and discharge devices for the discharge opening of hoppers containing particulate material and more specifically to an air and moisture resistant closure combined with a butterfly valve discharge control device positioned and secured under the discharge opening of a hopper.

The prior discharge devices for hoppers of the type used on semi-trailers, railroad cars or storage bins have been complex in construction and expensive to manufacture. For applications such as on semi-trailers and railroad cars, where the area surrounding the discharge opening is subjected to salt, slush, snow, cinders, dust, oil, dirt and similar contaminating materials, discharge devices have failed to adequately protect particulate material carried in the hopper from contamination both when the hopper is being transported from one location to another and when at a fixed discharge position at which the particulate material is dispensed from the hopper.

Discharge devices in the past which were capable of sealing the discharge opening of a hopper have been of substantial vertical height thereby causing the hopper to be positioned high above the highway or railroad tracks thereby reducing the stability of the semi-trailer or railroad car on which the hopper is mounted.

Accordingly, it is the principal object of this invention to provide a new and improved discharge assembly for preventing the contamination of material in a hopper during rail or other transportation of the hopper and when the hopper is at a discharge location for a dispensing of material from the hopper.

Another object of the present invention is to provide a discharge gate assembly which may be assembled and operated easily and quickly.

An additional object of the present invention is to provide a discharge gate assembly which is simple to manufacture and rugged in construction.

A further object of the present invention is to provide a hopper discharge gate assembly which projects a minimum distance below the discharge opening of the hopper to provide maximum ground clearance when the hopper is mounted on semi-trailers or railroad cars.

Yet another object of the present invention is the provision of an improved hopper discharge gate assembly with a manually operable valve to control the flow of particulate material from the hopper.

Achievement of the objects of this invention is enabled through the provision of a hopper having side walls and a discharge opening and a frame pivoted on a hinge connected to one of the hopper side wall and movable to a position covering the discharge opening. A seal is provided between the frame and the hopper to prevent contamination of the contents of the hopper. A passageway extends through the frame to permit dispensing of particulate material carried in the hopper. Control of the flow of particulate material through the passageway is achieved with a butterfly valve having a disc positioned in the passageway to restrict or prevent the flow of particulate material through the passageway. The butterfly valve disc is rotatable between fully opened and closed positions by a manually operated crank handle connected to the butterfly valve disc. The frame has downwardly and outwardly extending flange members to shield the passageway from contamination.

A bottom cover, conforming to the bottom of the frame and the frame flange members, is removably secured over the passageway and against a resilient seal surrounding the passageway to prevent the entry of contaminants into the particulate material being carried in the hopper. The side walls of the hopper and the edges of the discharge opening may be covered with a flexible hopper liner.

The manner in which the preferred embodiment of the invention achieves the objects of the invention will become more apparent when the following written description is considered in conjunction with the accompanying drawings.

DESCRIPTION OF THE DRAWINGS

FIG. 3 is a sectional view taken along lines 3—3 in FIG. 1; and

FIG. 4 is a sectional view taken along lines 4—4 of FIG. 3.

DESCRIPTION OF THE PREFERRED EMBODIMENT

Figure 1:
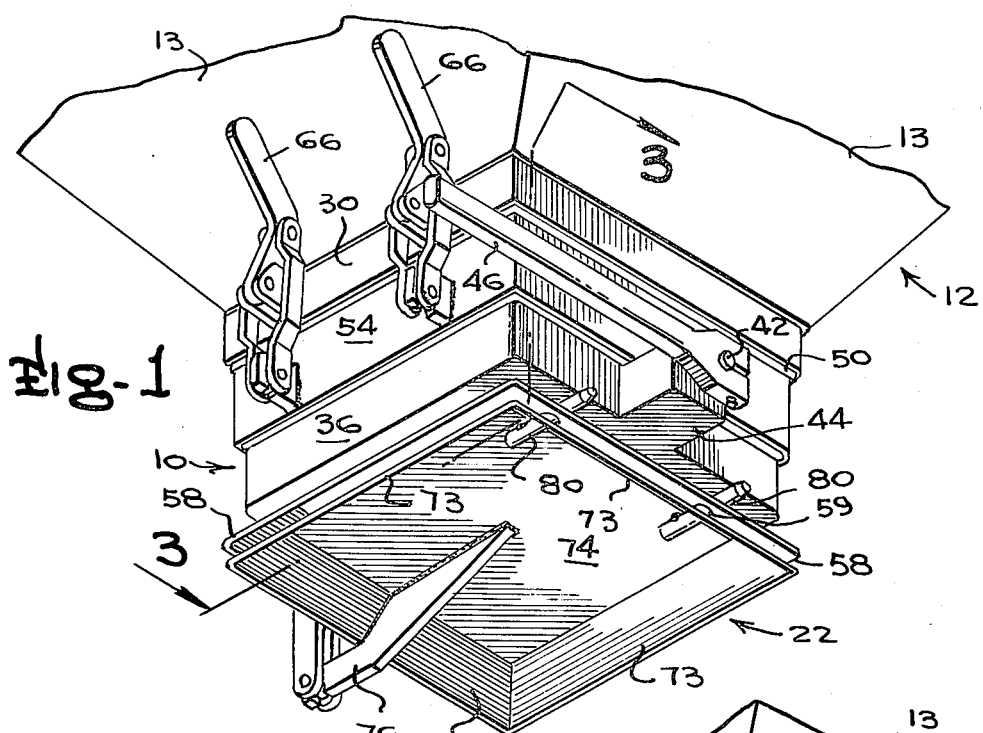
FIG. 1 is a perspective view of the preferred embodiment of the invention comprising a discharge gate assembly illustrated in fully closed condition.

The preferred embodiment of the invention comprises a gate assembly attachment 10 illustrated in FIG. 1 mounted in position on a hopper 12 formed of inclined walls 13 having lower edges defining a discharge opening through which particulate material stored in the hopper is dispensed in a well known manner. The hopper attachment 10 comprises a square frame formed of four identical side walls 14 which are welded to the lower edges of the walls 13 with the ends of the side walls 14 being welded together at the corners of the frame member. A cylindrical rod 15 is welded to the lower edge of each of the side walls 14 to provide a smooth and continuous lower edge for the frame bottom as best shown in FIG. 3.

A flexible plastic liner 16 is inserted in the hopper and extends downwardly through the frame formed of side walls 14. The liner is folded back against the outer surface of the hopper bottom side walls 14 and is retained in that position by an elastic band 17 which is stretched around the liner as shown in FIGS. 2, 3 and 4.

The gate assembly attachment includes a hinged frame 18 containing a butterfly valve 20 in a discharge passageway 21 which can be manually pivoted to a position parallel the discharge passageway 21 (as in FIG. 2) to permit particulate material carried in the hopper 12 to flow through passageway 21. A removable bottom cover 22 is clamped in a position over the discharge passageway 21 to protect particulate material in the hopper 12 and passageway 21 from external contamination.

The hopper is reinforced around the discharge opening by seal support member 28 which is welded along its inner edge to the lower edges of the hopper and by reinforcing members 30 which are welded to the outer edges of the seal support member 28 and to the hopper. A flat resilient outer seal 32 is fixed to the lower surface of the seal support member adjacent the outer edge of the seal support member.

Figure 2:
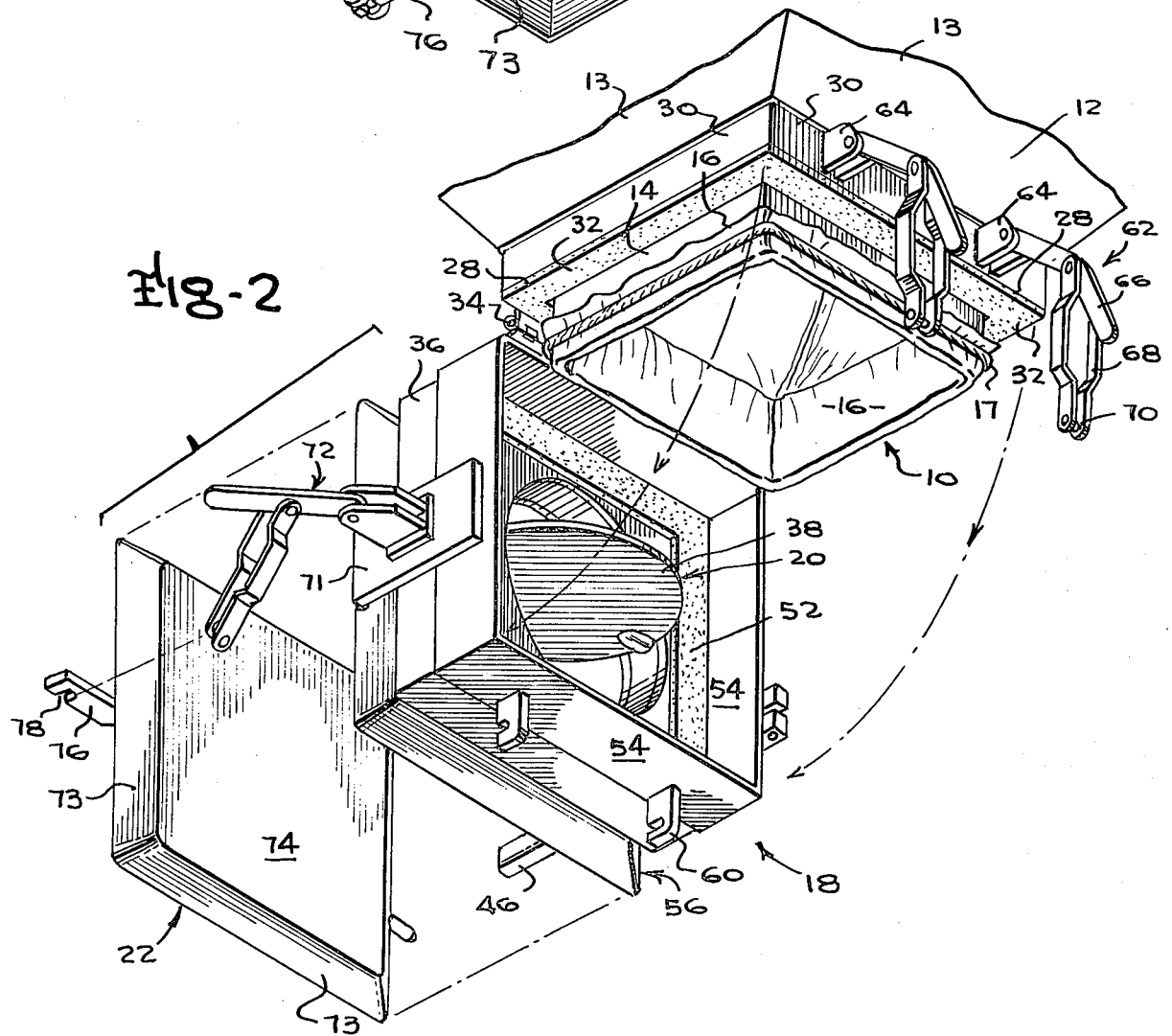
FIG. 2 is an exploded perspective view of the discharge gate assembly in a fully open position and at a different angle from that of FIG. 1.

A hinge 34, welded to the reinforcing member 30 and the frame 18 as shown in FIG. 4, permits the frame 18 to pivot downwardly away from the hopper as illustrated in FIG. 2 to enable the flexible plastic liner 16 to be replaced. The frame 18 includes a rigid clamp block 36 which is of square configuration with the butterfly valve 20 positioned in the concentric circular discharge passageway 21 defined by an internal cylindrical surface of the block 36. As shown in FIG. 3, the main element of the butterfly valve comprises a thin disc portion 38 which closes the circular discharge passageway when the disc is perpendicular to the axis of the discharge passageway. Disc 38 pivots about pivot members 40 and 42 (FIG. 3) which are pivotally supported in the clamp block 36 and through a support section 44 extending outwardly therefrom as best shown in FIGS. 1 and 3. A handle 46 having a slotted hole in one end is clamped over pivot member 42 by a clamping bolt 48 for enabling opening and closing movement of disc 38 in an obvious manner.

A central discharge section seal support plate 50 is fixed to the top of the clamp block 36 and is of square configuration with a concentric circular opening. A flat inner resilient seal member 52 is fixed to the upper surface of the seal support plate 50. Outer seal side walls 54 of the frame 14 are welded along their lower edges to the outer edges of the seal support 50 and the ends of the outer seal side walls 54 are welded together at the corners to form an upwardly opening receiving section for the hopper bottom and to seal with resilient seal 32 when the frame 18 is in a closed position.

One side of hinge 34 is welded to one of the outer seal side walls 54 which walls form a chute and the other side is welded to reinforcing member 30 as best illustrated in FIG. 4. Slotted latches 60 are welded centrally of the outer seal side wall 54 opposite the hinge 34.

A bottom flaring gate flange member 56 of generally square configuration and having a concentric circular opening to permit flow from clamp block 36 is welded to the lower surface of block 36 and has outwardly projecting side walls 58. The flange member 56 supports a flat seal 57 on its lower surface for engagement with removable bottom cover 22 to protect the butterfly valve 16 and passageway 21 from contamination. One of the side walls has two holes 59 symmetrical about the center and adjacent the upper edge of the side wall for a purpose to be discussed.

Toggle clamps 62 are welded to the reinforcing member 30 adjacent the slotted latches 60. The clamps 62 each comprise a support bracket 64, a handle 66 pivoted on the support bracket and a connecting link 68 pivoted at one end of the handle and having a latching member 70 at the other end which engages the slot in the downwardly slotted latch 60 as shown in FIG. 4.

A rectangular support plate 71 (shown in FIG. 3) is positioned and welded to an outer surface of the outer seal side wall 54 on the side of the frame 14 opposite the butterfly valve handle 46 with the plate being spaced outwardly of the clamp block 36 and having its lower edge welded to the downwardly projecting side wall 58 as best illustrated in FIG. 3. A toggle clamp 72 identical to clamp 62 described above is attached to a central portion of plate 71 as best illustrated in FIG. 2.

The bottom cover 22 includes canted side walls 73 and is identical in configuration with the bottom flaring gate flange member 56 with a flat plate portion 74 fully covering the area between side walls 73 as best illustrated in FIG. 3.

A latching bracket plate 76 is attached to the bottom of plate 74 and has a downwardly projecting slot 78 which is engaged by toggle clamp 72, to clampingly engage the upper surface of the bottom cover 22 with the resilient bottom gate seal 57 on the flaring gate flange member 56 as best illustrated in FIG. 4. Two pins 80, attached to plate 74 opposite the latching bracket 76, as seen in FIGS. 1 and 3, extend through the side walls of the bottom gate to engage the holes 59 in the outwardly projecting side walls 58, when the bottom cover 18 is being installed in the closed position as shown in FIGS. 1, 3 and 4. The pins 80 provide a pivot for the cover 18 when the cover is being clamped in position by toggle clamp 72 and also permit the removal of the cover as shown in FIG. 2.

To prepare the hopper and discharge gate assembly for use, plastic liner 16 is inserted into the hopper and extended through the discharge opening of the hopper bottom. The liner is positioned to form a smooth sealing surface over the rods 15 and is folded back over the outer surface of the hopper bottom and rods 15 as illustrated in FIGS. 3 and 4. Elastic band 17 is stretched over the liner to retain the liner in position. The frame 18 as shown in FIG. 4 is pivoted upwardly about its hinge 34 to the closed position and the toggle clamps 62 are engaged in the slotted latches 60. Handles 66 are moved upwardly to press the inner resilient seal 52 against the liner and the outer seal side walls 54 against the resilient outer seal 32 to form a contamination resistant seal with the hopper. After moving the butterfly valve disc 38 to a closed position, to permit installation of the bottom cover 22, pins 80 are inserted in the holes 59 in the outwardly projecting side walls 58 as shown in FIG. 3 and clamp 72 is engaged with the latching bracket 76 to clamp the bottom cover against the resilient bottom gate seal 57.

Locking devices may be incorporated in the clamps 62 and 72 to maintain the discharge gate assembly in the closed position as seen in FIG. 1 thereby preventing accidental or intentional discharge or contamination of the hopper contents.

When it is desired to discharge the contents of the hopper, the bottom cover 22 is removed and the butterfly valve handle 46 is turned to open the discharge passageway 21 by rotating the butterfly valve disc 38.

From the foregoing detailed description, it will be evident that there are a number of changes, adaptations and modifications of the present invention which will be obvious to those of skill in the art. Therefore the spirit and scope of the invention is to be limited solely by the appended claims.

We claim:

1. A discharge gate assembly for use with a hopper containing particulate material having a discharge opening, said gate assembly comprising a frame having a vertical discharge passage therethrough, a valve means in the discharge passage for regulating the flow of material through the discharge passage, support means for removably connecting the frame to the hopper in a position covering the hopper discharge opening, a sealing means between the frame and the hopper for preventing the entry of contamination into the discharge opening, said support means including hinge means connecting the frame to the hopper and a latching means for securing the frame against and in sealing engagement with the sealing means, cover means for closing the discharge passageway to prevent, the entry of contamination into the discharge passageway, a flexible hopper liner which extends downwardly through the discharge opening and is folded back against the outer surface of the hopper and retaining means for holding the hopper liner against the outer surface of the hopper.

2. A discharge gate assembly for use with a hopper having a discharge opening comprising a hopper attachment surrounding the discharge opening and having side walls with planer lower edges which form a chute with the top edges of said chute being attached to the hopper, a flexible hopper liner which extends downwardly through the discharge opening outwardly around and beneath the lower edges of the side walls and back upwardly against the outer surfaces of the side walls, a retaining means for holding the hopper liner against the outer surfaces of the side walls, at least one hinge fixed to the outer surface of one of the side walls, a butterfly valve frame connected to the hinge to permit positioning of the butterfly valve frame in a closed position adjacent the lower portions of the side walls and having a discharge passage therethrough aligned with the space between said side walls, an inner resilient seal means attached to the butterfly valve frame to press against the hopper liner on the bottom edges of the side walls for sealing the interface between the bottom portions of the liner extending about the lower edges of the side walls and the butterfly valve frame, at least one latching means on the side wall of the hopper bottom for securing the butterfly valve frame in the position adjacent the hopper extension, a butterfly valve in the discharge passage in the butterfly valve frame, and cover means for sealing the discharge passage to prevent the entry of contamination into the discharge passage.

3. The discharge gate assembly according to claim 2 additionally including a planar seal carrying member having inner and outer edges with the inner edges fixed to said side walls, an outer support member of chute configuration having lower edges fixed to the outer edges of the planar seal carrying member and having upper edges fixed to the hopper, an outer resilient seal means attached to the planar seal carrying members for creating an outer seal between the hopper and the butterfly valve frame, a cylindrical rod coplanar with and fixed to the lower edges of the hopper extension side walls to create an arcurate continuous seal area between the liner and the inner resilient seal means, side walls on the butterfly valve frame which extend upwardly and around the hopper extension to sealingly engage an outer seal enclosing the outer periphery of the walls of said chute when the butterfly valve frame is in its closed position adjacent the lower portions of the side walls, pivot members for the butterfly valve extending into the butterfly valve frame with one pivot member extending beyond the frame, a manually operable crank handle fixed to the pivot member extending beyond the frame, a downwardly projecting flange member surrounding and positioned below the discharge passage of the butterfly valve frame, a removable bottom cover conforming in shape to the downwardly projecting flange member, and a resilient sealing member between the downwardly projecting flange member and the removable bottom cover to seal the lower opening of the discharge passage.

4. The discharge gate assembly according to claim 3, wherein the butterfly frame securing means comprises a toggle action clamp with an upper portion fixed to the sealing surface support member and a lower portion fixed to the butterfly valve frame and wherein the bottom cover has a pin extending outwardly from the bottom cover which can be inserted in the hole in the downwardly projecting flange member and has a toggle action clamp connected to the frame to retain the cover against the butterfly valve frame.

5. A hopper and discharge gate assembly for containing and dispensing particulate material comprising a hopper having side walls and a discharge opening, a frame having a vertical discharge passage therethrough, support means for removably connecting the frame to the hopper in a position covering the hopper discharge opening, a valve means in the discharge passage for regulating the flow of materials through the discharge passage, a sealing means between the frame and the hopper for preventing the entry of contamination into the discharge opening, said support means including hinge means connecting the frame to the hopper and a latching means for securing the frame against and in sealing engagement with the sealing means, cover means for closing the discharge passageway, a flexible hopper liner which extends downwardly through the discharge opening and is folded back against the outer surface of the hopper, and retaining means for holding the hopper liner against the outer surface of the hopper.

6. A hopper and discharge gate assembly for containing and dispensing particulate material comprising a hopper having sidewalls and a discharge opening, a hopper attachment surrounding the discharge opening and having side walls with planar lower edges which form a chute with the top edges of said surround being attached to the hopper, a flexible hopper liner which extends downwardly through the discharge opening outwardly around and beneath the lower edges of the side walls and back upwardly against the outer surfaces of the side walls, a retaining means for holding the hopper liner against the outer surfaces of the side walls, at least one hinge fixed to the outer surface of one of the side walls, a butterfly valve frame connected to the hinge to permit positioning of the butterfly valve frame in a closed position adjacent the lower portions of the side walls and having a discharge passage therethrough aligned with the space between said side walls, an inner resilient seal means attached to the butterfly valve frame to press against the hopper liner of the bottom edges of the side walls for sealing the interface between the bottom portions of the liner extending about the lower edges of the side walls and the butterfly valve frame, at least one latching means on the side wall of the hopper bottom for securing the butterfly valve frame in the position adjacent the hopper extension, a butterfly valve in the discharge passage in the butterfly valve frame, and cover means for sealing the discharge passage to prevent the entry of contamination into the discharge passage.

7. The hopper and discharge gate assembly according to claim 6 additionally including a planar seal carrying member having inner and outer edges with the inner edges fixed to said side walls, an outer support member of chute configuration having lower edges fixed to the outer edges of the planar seal carrying members and having upper edges fixed to the hopper, an outer resilient seal means attached to the planar seal carrying members for creating an outer seal between the hopper and the butterfly valve frame, a cylindrical rod coplanar with and fixed to the lower edges of the hopper extension side walls to create an arcuate continuous seal area between the liner and the inner resilient seal means, side walls on the butterfly valve frame which extend upwardly and around the hopper extension to sealing engage an outer seal enclosing the outer periphery of the walls of said chute when the butterfly valve frame is in its closed position adjacent the lower portion of the side walls, pivot members for the butterfly valve extending into the butterfly frame with one pivot member extending beyond the frame, a manually operable crank handle fixed to the pivot member extending beyond the frame, a downwardly projecting flange member surrounding and positioned below the discharge passage of the butterfly valve frame, a removable bottom cover conforming in shape to the downwardly projecting flange member, and a resilient sealing member between the downwardly projecting flange member and the removable bottom cover to seal the lower opening of the discharge passage.

8. The hopper and discharge gate assembly according to claim 1, wherein the butterfly frame securing means comprises a toggle action clamp with an upper portion fixed to the sealing surface support member and a lower portion fixed to the butterfly valve frame and wherein the bottom cover has a pin extending outwardly from the bottom cover which can be inserted in the hole in the downwardly projecting flange member and has a toggle action clamp connected to the frame to retain the cover against the butterfly valve frame.

* * * * *